US012216389B2

United States Patent
Oba et al.

(10) Patent No.: US 12,216,389 B2
(45) Date of Patent: Feb. 4, 2025

(54) IN-VEHICLE CAMERA

(71) Applicant: Mitsubishi Electric Corporation, Tokyo (JP)

(72) Inventors: Tetsuya Oba, Tokyo (JP); Kazuhisa Takashima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 528 days.

(21) Appl. No.: 17/623,656

(22) PCT Filed: Sep. 25, 2019

(86) PCT No.: PCT/JP2019/037563
§ 371 (c)(1),
(2) Date: Dec. 29, 2021

(87) PCT Pub. No.: WO2021/059393
PCT Pub. Date: Apr. 1, 2021

(65) Prior Publication Data
US 2022/0291572 A1    Sep. 15, 2022

(51) Int. Cl.
*G03B 17/55*    (2021.01)
*B60R 11/04*    (2006.01)
(Continued)

(52) U.S. Cl.
CPC ............. *G03B 17/55* (2013.01); *B60R 11/04* (2013.01); *B60R 16/03* (2013.01); *G03B 30/00* (2021.01);
(Continued)

(58) Field of Classification Search
CPC .................................. B60R 11/04; H04N 23/51
See application file for complete search history.

(56) References Cited

U.S. PATENT DOCUMENTS 7,855,891 B1 * 12/2010 Ayres, III .......... H05K 7/20445
174/547
8,759,693 B2 * 6/2014 Yang .................... H05K 9/0041
174/383
(Continued)

FOREIGN PATENT DOCUMENTS

JP    2017-118445 A    6/2017
JP    2017-525310 A    8/2017
(Continued)

OTHER PUBLICATIONS

Office Action issued Dec. 9, 2023 in Chinese Application No. 201980100436.9.
(Continued)

*Primary Examiner* — Leon W Rhodes, Jr.
(74) *Attorney, Agent, or Firm* — Sughrue Mion, PLLC

(57) ABSTRACT

The in-vehicle camera comprises a lens barrel; a circuit board on which an image processing circuit is mounted, the image processing circuit performing image processing to recognize a subject from video signals; and a housing which includes an intake vent and an exhaust vent and accommodates therein the circuit board such that the image processing circuit and the lens barrel are away from each other in the left-right direction. The in-vehicle camera is configured such that a ventilation passage connecting the intake vent and an exhaust vent is formed between an inner face on a side of the installation face of the housing and the circuit board in a path that is away from the lens barrel and passes through a region in which the image processing circuit is disposed.

14 Claims, 7 Drawing Sheets

(51) Int. Cl.
  *B60R 16/03*    (2006.01)
  *G03B 30/00*    (2021.01)
  *H04N 23/51*    (2023.01)
  *H04N 23/52*    (2023.01)
  *B60R 11/00*    (2006.01)

(52) U.S. Cl.
  CPC ............ *H04N 23/51* (2023.01); *H04N 23/52* (2023.01); *B60R 2011/0026* (2013.01)

(56) References Cited

U.S. PATENT DOCUMENTS

| | | | |
|---|---|---|---|
| 9,487,159 B2* | 11/2016 | Achenbach | B60R 11/04 |
| 9,854,225 B2* | 12/2017 | Kimura | B60R 11/04 |
| 10,131,292 B2* | 11/2018 | Oh | B60R 11/04 |
| 10,609,260 B2* | 3/2020 | Müller | G03B 17/55 |
| 11,019,324 B2* | 5/2021 | Ishii | G03B 15/00 |
| 2017/0155808 A1 | 6/2017 | Seger et al. | |
| 2017/0187931 A1 | 6/2017 | Onishi et al. | |
| 2019/0320159 A1 | 10/2019 | Ishii et al. | |

FOREIGN PATENT DOCUMENTS

| | | |
|---|---|---|
| JP | 2018-109724 A | 7/2018 |
| WO | 2018/128083 A1 | 7/2018 |

OTHER PUBLICATIONS

International Search Report of PCT/JP2019/037563 dated Dec. 17, 2019 [PCT/ISA/210].
Office Action dated Apr. 5, 2022 in Japanese Application No. 2021-548041.

\* cited by examiner

IN-VEHICLE CAMERA

CROSS REFERENCE TO RELATED APPLICATIONS

This application is a National Stage of International Application No. PCT/JP2019/037563 filed on Sep. 25, 2019.

TECHNICAL FIELD

The present application relates to an in-vehicle camera.

BACKGROUND ART

In recent years, an advanced driver-assistance systems (ADAS) for implementing collision prevention, preceding vehicle following control, lane maintenance control, and the like has been widely put into practical application. In the ADAS, for example, objects such as preceding vehicles, oncoming vehicles, and crossing pedestrians, and information on the transportation infrastructure such as lanes (lane information), traffic signs, road signs, and traffic signals are recognized by an in-vehicle camera provided on an upper part of the front windshield of a vehicle.

In order to accurately recognize the objects, the information on the transportation infrastructure, and the like, it is necessary to transmit the signals, which are grouped in each of a plurality of transmission lines output from an imaging element located behind the lens barrel, to an image processing circuit mounted on a circuit board in phase with each other. For this reason, it is desirable that the image processing circuit is disposed on a straight line obtained by projecting an optical axis of the lens barrel onto the circuit board so that the transmission paths from the imaging element to the image processing circuit can be easily arranged in an equal length.

Then, the imaging element or the lens barrel is heated by the thermal agitation of the air heated by the image processing circuit, and in particular, when the temperature exceeds an upper limit temperature at which the lens barrel, which is an optical device, can correctly operate, accurate recognition is hindered. Therefore, in order to efficiently dissipate heat to avoid direct application of heated air to the imaging element, an in-vehicle camera is disclosed in which the imaging element and the image processing circuit are separately arranged into an upper and lower space sectioned vertically, and convection is caused vertically by a cutout in a circuit board provided behind the imaging device (refer to, for example, Patent Document 1).

CITATION LIST

Patent Document
Patent Document 1; Japanese Patent Application Laid-open No. 2017-118445 (Paragraphs 0012 to 0038, FIG. 2 to FIG. 5)

SUMMARY OF INVENTION

Problems to be Solved by Invention

However, even if the position of the cutout is shifted in the left-right direction with respect to the imaging device, the heat generated in the image processing circuit is transmitted to the circuit board right above, and the temperature of the imaging device or the lens barrel right above the circuit board may rise to cause a problem.

The present application discloses a technique to solve the problem described above and an object thereof is to obtain a highly reliable in-vehicle camera capable of efficiently dissipating heat without causing an increase in the temperature of the lens barrel.

Means for Solving Problems

An in-vehicle camera disclosed in the present application comprises a lens barrel to form an image of light from a subject on a sensor surface of an imaging element; a circuit board on which an image processing circuit is mounted, the image processing circuit being wire-connected to the imaging element and performing image processing to recognize the subject from a video signal output from the imaging element; and a housing including an installation face to be attached to an inner face of a front windshield or a rear windshield of a vehicle that slopes in a front-rear direction, a vent hole formed at each of ends located on a lower side and an upper side when the installation face is attached along the inner face, and a holding mechanism to hold the lens barrel with a portion thereof exposed from the installation face such that an optical axis extends toward an outside of a vehicle, the housing accommodating the circuit board while separating the image processing circuit and the lens barrel from each other in a direction that is parallel to the installation face and is perpendicular to the optical axis, wherein a ventilation passage connecting the vent hole on the lower side and the vent hole on the upper side is formed between an inner face on a side of the installation face of the housing and the circuit board in a path that is away from the lens barrel and passes through a region in which the image processing circuit is disposed.

Effect of Invention

According to the in-vehicle camera disclosed in the present application, since the air heated by the heat generating member is discharged so as to avoid the lens barrel, it is possible to obtain a highly reliable in-vehicle camera capable of efficiently dissipating the heat.

MODES FOR CARRYING OUT INVENTION

Embodiment 1

Figure 1A:
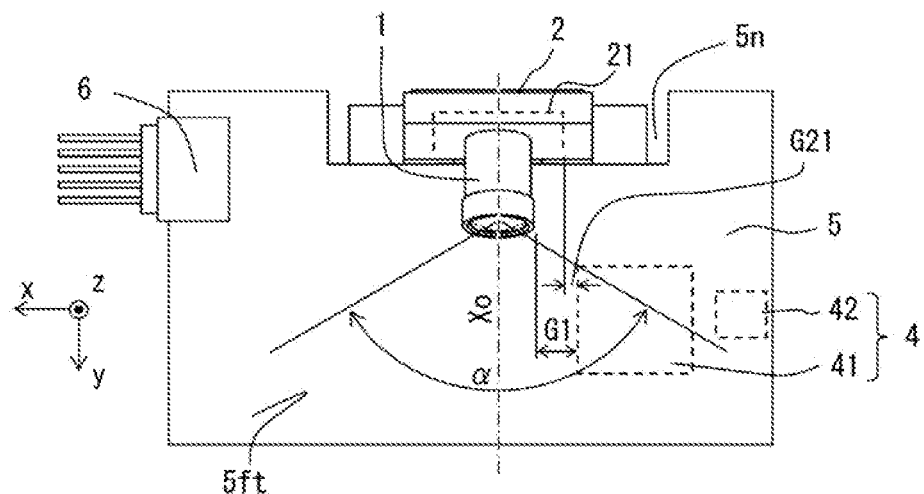
FIG. 1A and FIG. 1B are a plan view showing an arrangement of components on a circuit board in an in-vehicle camera and a perspective view of the entire in-vehicle camera, according to Embodiment 1, respectively.
Figure 1B:
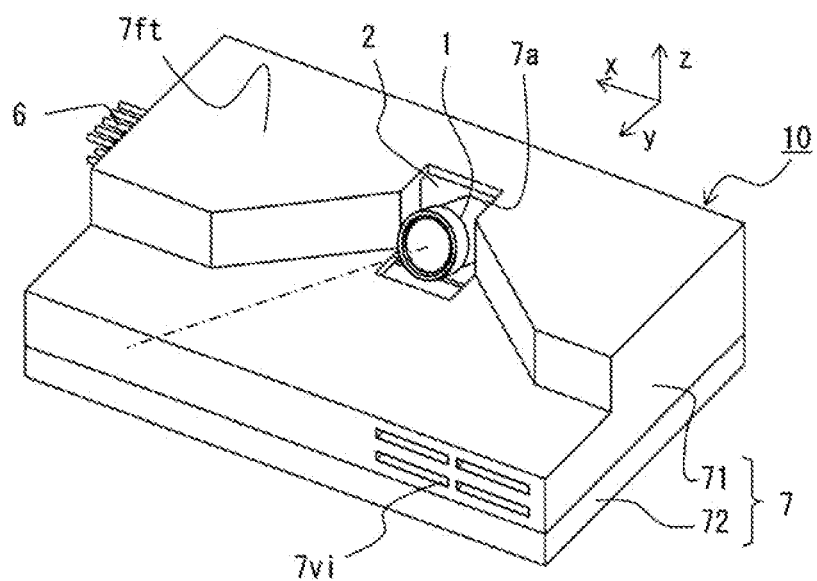
Figure 2:
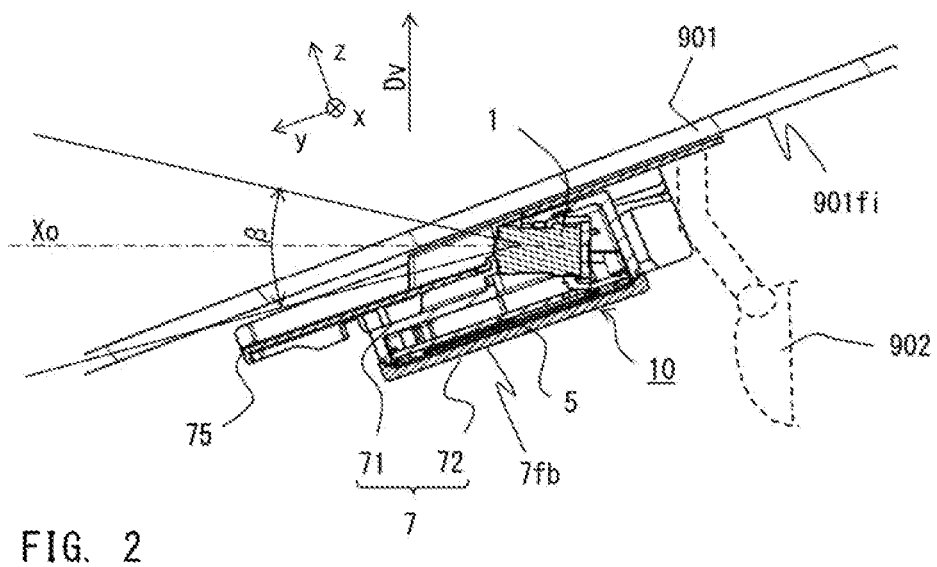
FIG. 2 is a schematic cross-sectional view showing a state in which the in-vehicle camera according to Embodiment 1 is mounted in a vehicle.

FIG. 1A, FIG. 1B to FIG. 4A, FIG. 4B are diagrams for describing an in-vehicle camera according to Embodiment 1, FIG. 1A is a plan view showing an arrangement of main components such as a lens barrel and heat generating members on a circuit board that constitute the in-vehicle camera, and FIG. 1B is a perspective view showing the entire in-vehicle camera viewed from an upper left part of the top side, and FIG. 2 is a cross-sectional schematic view including an optical axis and a vertical line, showing a state where the in-vehicle camera is mounted on a vehicle.

Figure 3:
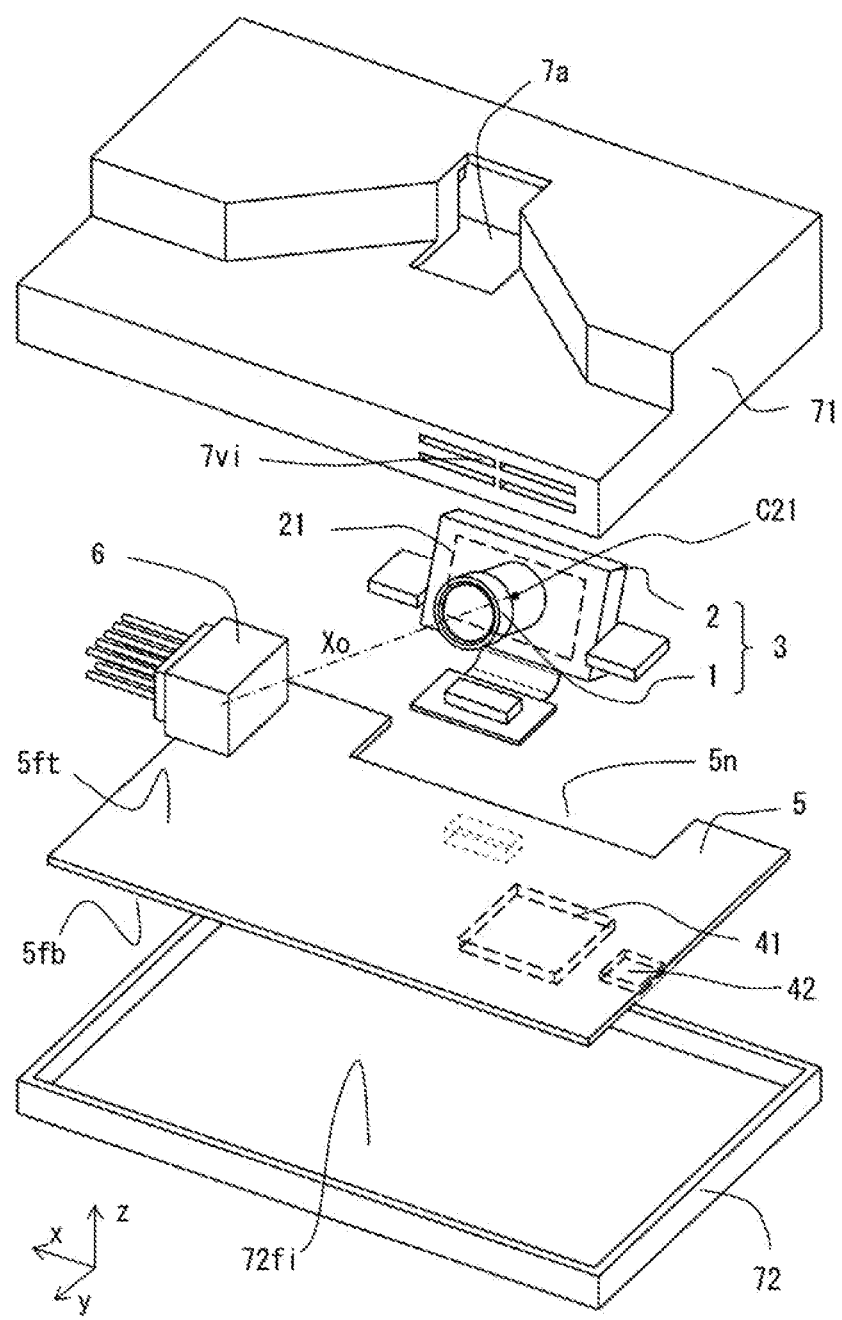
FIG. 3 is a developed view showing a state before assembling the in-vehicle camera according to Embodiment 1.
Figure 4A:
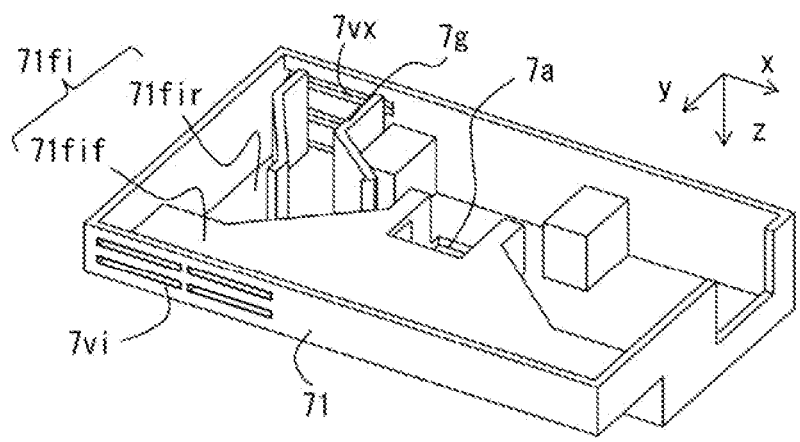
FIG. 4A and FIG. 4B are a perspective view of an upper housing constituting the in-vehicle camera according to Embodiment 1 viewed from the bottom side and a partially cutout perspective view in which main components are incorporated inside the upper housing viewed from the top side, respectively.
Figure 4B:
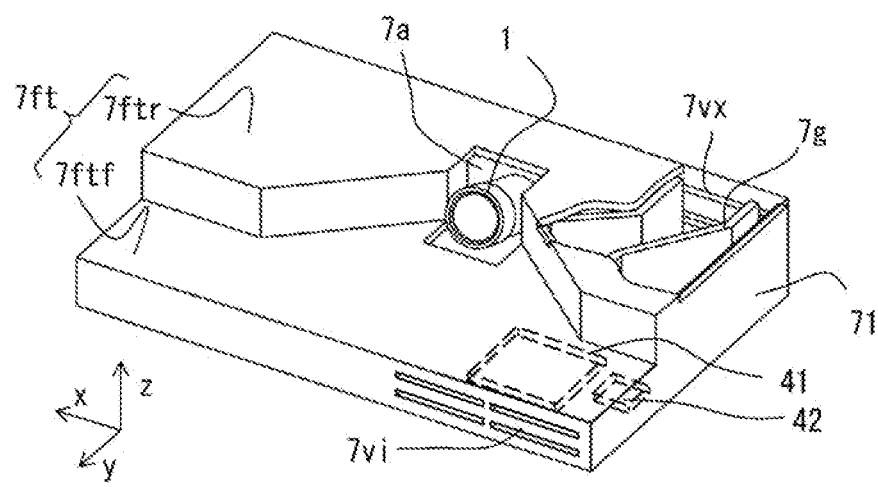

FIG. 3 is a developed view showing a state before the camera module and the circuit board of the in-vehicle camera are incorporated into a housing, and FIG. 4A is a perspective view showing an inner face side of an upper housing as viewed from the bottom side, and FIG. 4B is a partially cutout perspective view visualizing an internal structure in which the camera module and the circuit board are incorporated into the upper housing, as viewed from the same angle as in FIG. 1B.

When the in-vehicle camera 10 according to each embodiment of the present application is used for forward monitoring, as shown in FIG. 2, the in-vehicle camera 10 is disposed at a region of a front windshield 901 of a vehicle that does not obstruct the view of a driver, for example, on a forward side to a rear-view mirror 902. A housing 7 is configured to be able to be detachably installed on a bracket 75 fixed to the inner face 901fi of the front windshield 901.

Note that the front windshield 901 to which the in-vehicle camera 10 is to be installed is not vertical (parallel to the vertical direction Dv) but slopes downward toward the front. However, also in the following embodiments, regarding the direction of the in-vehicle camera 10, the face facing the front windshield 901 (inner face 901fi) is defined as the top face (upper side), the opposite side is defined as the bottom face (lower side), and the vertical direction or the thickness direction is defined as the z direction. Further, the side toward the front of a vehicle (the side to be imaged) is the front side, the side toward the rear is the rear side, the front-rear direction is displayed as the y-direction, and the left-right direction is displayed as the x-direction.

And by fixing the optical axis Xo of the lens barrel 1 in a set position and orientation, a scene in a predetermined range in the forward side of a vehicle is settled within the angle of view B in accordance with the specifications of the lens, and can be utilized for recognition of objects, the information on the transportation infrastructure, and the like. Note that, the configuration and operation of the in-vehicle camera 10 of the present application will be described assuming that the in-vehicle camera 10 is fixed to the front windshield, but they can also be applied to a case where it is fixed to a rear windshield. In this case, the front shall be read as the side toward the rear windshield, that is, the rear of a vehicle for the imaging side.

Here, prior to the description of the characteristic configuration of the in-vehicle camera 10 of the present application, the basic configuration and operation of the in-vehicle camera 10 will be described referring to FIG. 3. In the in-vehicle camera 10, a camera module 3 and a connector 6 for making electrical connection with devices within a vehicle are mounted on a circuit board 5 on which an image processing circuit 41 for performing image processing is mounted, the camera module 3 being a module in which a camera board 2 on which an imaging element 21 is mounted, and a lens barrel 1 are integrated. Further, the housing 7 includes an upper housing 71 which fixes a position and an angle of the lens barrel 1, covers the camera module 3 and the circuit board 5 from above, and has an opening 7a for exposing the lens barrel 1, and a lower housing 72 which covers the lower part of the circuit board 5.

In the mounting state as shown in FIG. 2, the light incident from the front side of a vehicle forms an image on the sensor surface of the imaging element 21 through a lens (reference numeral not shown) that is incorporated in the lens barrel 1 exposed from the opening 7a as shown in FIG. 1B, and is converted into an electric signal in the imaging element 21. Video information on the forward side of a vehicle (referred to as a video signal) converted into the electric signal is transmitted to the circuit board 5 via wiring in the camera board 2 constituting the camera module 3, and a flexible cable.

The video signal transmitted to the circuit board 5 is input to an image processing circuit 41 that is formed in a single element as a system-on-a-chip (SoC) mounted on a mounting face 5fb (FIG. 3) on the lower side of the circuit board 5 via a transmission line wired in a surface layer or an inner layer of the circuit board 5. In addition, a memory 42 for securing a memory space necessary for the processing when the image processing circuit 41 executes the image processing is mounted in the immediate vicinity of the image processing circuit 41. For example, a LowPowerDDR4 (LPDDR4) may be used as the memory 42.

In this basic configuration, the optical axis Xo of the lens barrel 1 extends in the y-z plane having no x-direction component in the in-vehicle camera 10 so as to extend straight forward in the mounting state. From optical consideration for focusing the image collected by the lens barrel 1 on the sensor surface of the imaging element 21, the positional relationship between the lens barrel 1 and the imaging element 21 is set such that the center of the optical axis Xo of the lens barrel 1 coincides with the center C21 of the sensor surface of the imaging element 21.

Meanwhile, the video signal output from the imaging element 21 is input to the image processing circuit 41, for example, in a high-speed transmission specification: Mobile Industry Processor Interface Camera Serial Interface 2 (MIPI CSI-2). In this case, since the video signal separately flows into a plurality of transmission lines, it is necessary to transmit the video signal in synchronization with each other in the same phase, and thus it is necessary to make the lengths of wires physically the same. As a result, as disclosed in Patent Document 1, it is desirable that a plurality of lanes for transmitting the video signal from the imaging element to the image processing circuit be linear and wired in parallel with each other.

The image processing circuit and the memory are electrically connected with high-speed transmission of, for example, a bus width of 32 bits and a clock frequency of 1.6

GHz and are connected by the plurality of transmission lines. In this case, since the transmission lines need to be synchronized with each other, the transmission lines between the image processing circuit and the memory also need to be linearly arranged and connected in an equal length. Therefore, it is desirable that the plurality of lanes are linear and wired in parallel with each other.

Therefore, in the conventional in-vehicle camera, as shown in Patent Document 1, there is a problem in that the image processing circuit is disposed in a region where an optical axis is projected on the circuit board, and heat generated by semiconductor elements such as the image processing circuit and the memory adversely affects the operation of the camera module 3. In contrast, in the in-vehicle camera 10 of the present application, as shown in FIG. 1A, the arrangement of the lens barrel 1 and the image processing circuit 41 is set such that the image processing circuit 41 is shifted in the left-right direction (x-direction: right side in the present example) from the line on which the optical axis Xo is projected on the circuit board 5.

Specifically, other than the optical axis Xo, but also the outer periphery portion of the lens barrel 1 is spaced apart from the image processing circuit 41 by an interval G1 so as not to have an overlap in the left-right direction. Further, an interval G21 is provided so that an end portion of the imaging element 21 does not overlap with the image processing circuit 41 in the left-right direction. In addition, the mounting position of the memory 42 is shifted not in the front-rear direction of the image processing circuit 41 but in the left-right direction to a position further apart from the lens barrel 1 (right side in the present example).

That is, the heat generating members 4 (the image processing circuit 41 and the memory 42) in the in-vehicle camera 10 are disposed without having an overlap in the left-right direction on the circuit board 5 with respect to the lens barrel 1 and the imaging element 21, and further, the intervals G1 and G21 are provided. The heat generating members 4 themselves are also disposed on the circuit board 5 without having an overlap with each other in the left-right direction and are spaced apart from each other. The connector 6 for making electrical connection with devices within a vehicle is provided on the left side of the lens barrel 1 (a plane that includes the optical axis Xo and is perpendicular to a top face 7ft), which is located on the opposite side of the heat generating members 4.

As described above, by shifting the image processing circuit 41 from the lens barrel 1 in the left-right direction, it is not necessary to dispose main circuit components in the front side of the camera module 3. Therefore, in the present example, a cutout portion 5n is provided on the rear side of the circuit board 5, the camera module 3 is fitted into the cutout portion 5n, and the camera board 2 is disposed to straddle the circuit board 5 in the thickness direction (z-direction).

Further, as shown in FIG. 4A and FIG. 4B, an intake vent 7vi and an exhaust vent 7vx are provided on the front side and the rear side of the upper housing 71, respectively, on the right side where the heat generating members 4 are located. The intake vent 7vi is opened wider than an arrangement range of the heat generating members 4 so as to cover the range in the left-right direction where the heat generating members 4 are disposed. However, the left end portion of the exhaust vent 7vx (the end portion closer to the lens barrel 1) is located closer to the right end than the left end portion of the intake vent 7vi, and is opened narrower than the arrangement range of the heat generating members 4.

Meanwhile, of the top face 7ft of the upper housing 71 which serves as an installation face to the front windshield 901, a front-side top face 7ftf is not covered with the bracket 75 in many areas so as not to obstruct the field of view of the lens barrel 1 exposed from the opening 7a. The top face 7ft has a two-stage structure in which the front-side top face 7ftf is one stage lower than a rear-side top face 7ftr. Therefore, an inner face 71fi has a two-stage structure in which a rear-side inner face 71fir is located deeper than a front-side inner face 71fif. However, the portion between the front-side inner face 71fif and the rear-side inner face 71fir where an angle changes is connected such that the cross-section thereof in the y-z plane is a smooth curve formed by connecting circular arcs. Note that, in the thickness direction (z-direction), right above the region where the heat generating members 4 are disposed is the front-side inner face 71fif, but a gap is provided between the front-side inner face 71fif and an upper face 5ft of the circuit board 5.

In addition, a ventilation guide 7g extending toward the exhaust vent 7vx is provided in a region in the rear-side inner face 71fir where the heat generating members 4 are disposed in the left-right direction. The ventilation guide 7g is inclined toward the right side as it is apart from the lens barrel 1 toward the rear side in accordance with the difference in width between the intake vent 7vi and the exhaust vent 7vx, and extends substantially straight in the front-rear direction (parallel to the y-direction) on the side close to the rear side. The height of the ventilation guide 7g from the rear-side inner face 71fir is set higher than the front-side inner face 71fif so as not to substantially make a gap between the ventilation guide 7g and the circuit board 5 when combined with the circuit board 5.

Although the housing 7 is assumed to be an aluminum die-cast product, it is not limited to this, and a material having excellent electrical conductivity and thermal conductivity, such as a resin molded article containing a heat transfer filler, a conductive filler, or the like, is desirable. In addition, from the viewpoint of heat transfer, the ventilation guide 7g is preferably integrally molded with the upper housing 71.

Further, from the viewpoint of electromagnetic wave shielding based on the electrical conductivity, it is desirable that dimensions of the practically continuous opening (in the longitudinal direction) of the intake vent 7vi and the exhaust vent 7vx should be one fourth or less of the free space wavelength of electromagnetic wave noise that is assumed, in order to prevent penetration or leakage of the electromagnetic wave noise. For example, in the radiation test for in-vehicle electronic devices based on the ALSE method specified in ISO 11452-2, it is desirable to set the opening dimension to 18 mm or less for the radio waves of 200 MHz to 4 GHz as ¼ of the shortest wavelength of 74.5 mm in 4 GHz.

Note that, "practically continuous" means that, even if the opening dimension of the exhaust vent 7vx itself is 30 mm continuous, the dimension (in the longitudinal direction) of the divided opening portion needs only 18 mm or less when the exhaust vent 7vx is divided by the ventilation guide 7g having the conductive material. As a result, it is possible to suppress the penetration of radio waves which may be affected through the openings of the intake vent 7vi and the exhaust vent 7vx.

Note that, the lower housing 72 constituting the bottom face 7fb of the housing 7 is basically formed flat, and an inner face 72fi (FIG. 3) has a certain distance from the mounting face 5fb of the circuit board 5. The image processing circuit 41 and the memory 42 mounted on the mounting face 5*fb* of the circuit board 5 are brought into contact with the inner face 72*fi* directly or through a heat transfer member to be thermally connected to the lower housing 72.

The operation will be described on the basis of the above configuration. When the in-vehicle camera 10 is operated, both the image processing circuit 41 and the memory 42, which are the heat generating members 4, generate heat because they perform a lot of image processing. Although the temperature rise due to the heat generation affects other adjacent elements and makes themselves difficult to operate stably, most of the generated heat is directly transferred to the inner face 72*fi* and can be dissipated to the outside air through the lower housing 72.

Then, on the opposite side of the surface on which the heat generating members 4 are mounted, it can also be considered that the upper face 5*ft* and the front-side inner face 71*fif* are brought into contact with each other or thermally connected to each other, and the heat is dissipated to the outside air through the upper housing 71. However, since the front-side top face 7*ftf* of the top face 7*ft* in the upper housing 71 includes a large area which is not covered by the bracket 75, the front-side top face 7*ftf* may be exposed to sunlight. Therefore, there is a possibility that the temperature of the circuit board 5 may be raised by the heat generated by sunlight, so that it is necessary to provide a gap between the circuit board 5 and the upper housing 71 (particularly, the front-side inner face 71*fif*) to thermally insulate the circuit board 5 from the upper housing 71, and thus heat dissipation due to heat transfer from the upper face 5*ft* side cannot be expected.

Meanwhile, the lens barrel 1 having a lens needs to maintain mechanical accuracy in order to maintain optical performance. That is, the lens barrel 1 is more susceptible to the thermal effect, such as the effect of optical distortion caused by thermal strain, than electronic components mounted on circuit board 5, etc., and the temperature range over which the performance can be guaranteed is narrow (the upper temperature limit is low). Therefore, even if the temperature of the electronic components can be controlled within the temperature range in which they operate normally by the heat dissipation from the lower housing 72, the temperature of the lens barrel 1 may fall into a temperature range in which optically accurate imaging is not possible. In such a case, the image will be distorted and the camera will not be able to show the function and performance related to subject recognition that are expected as the in-vehicle camera 10.

In contrast, in the in-vehicle camera 10 of the present invention, the heat generating members 4 are shifted from the lens barrel 1 in the left-right direction (x-direction), and the intake vent 7*vi* and the exhaust vent 7*vx* are disposed in the front and rear to the heat generating members 4. Thus, when an inclination toward the vertical direction from the front to the rear occurs in its installation in a vehicle (installation on the front windshield 901), the arrangement region of the lens barrel 1 located on the upside to a mounting region of the heat generating members 4 in the upper face 5*ft* does not overlap in the left-right direction with the mounting region. Meanwhile, in the space formed between the upper face 5*ft* of the circuit board 5 and the inner face 71*fi* of the upper housing 71, the region of the heat generating members 4 are located on the path connecting the intake vent 7*vi* and the exhaust vent 7*vx* in the shortest distance.

Therefore, the path of air flow from the intake vent 7*vi* to the exhaust vent 7*vx* that is generated in the space relative to the inner face 71*fi* of the upper housing 71 and that is caused by the heating of the air in the portion of the mounting region of the heat generating members 4 in the upper face 5*ft* is away from the arrangement region of the lens barrel 1. That is, the air heated in the mounting area of the heat generating members 4 flows in a region other than the arrangement region of the lens barrel 1 located downstream (upside).

At this time, the left end of the exhaust vent 7*vx* (on the side closer to the lens barrel 1) is located on the right side (on the side farther from the lens barrel 1) to the end of the intake vent 7*vi* that is on the side closer to the lens barrel 1. Therefore, the path of the airflow is formed such that, as the air moves toward the rear side, it flows further away from the mounting region of the lens barrel 1. Therefore, the hot air does not reach the arrangement region of the lens barrel 1. Then, since the portion between the front-side inner face 71*fif* and the rear-side inner face 71*fir* where the angle changes is continuous and having a smooth curve, the air smoothly flows from the front-side inner face 71*fif* along the rear-side inner face 71*fir*, and turbulence such as separation from the wall surface and vortex generation can be suppressed.

Further, since the ventilation guide 7*g* protruding from the inner face 71*fi* isolates the heated air flowing along the inner face 71*fi* from the lens barrel 1, the influence of the heat on the lens barrel 1 can be reduced. In particular, since the ventilation guide 7*g* is formed to have an inclination toward the right side at a portion in the front-rear direction before reaching the arrangement region of the lens barrel 1 as it approaches toward the rear side, the air flow is further guided in a direction away from the lens barrel 1, thereby further bringing about an effect of reducing the thermal influence on the lens barrel 1.

Further, among the components mounted on the circuit board 5, the connector 6 having the largest thickness other than the lens barrel 1 is disposed on the opposite side of the heat generating members 4 in the left-right direction with respect to the lens barrel 1, and thus the connector 6 can be eliminated from the path of the air flow described above. Since the connector 6 for making an electrical connection with devices within a vehicle is thicker than other components, it is basically disposed on the rear side of the circuit board 5. Further, since being thicker than other circuit components, the connector is mounted on the side of the upper face 5*ft* in the circuit board 5 facing the rear-side inner face 71*fir* as a region where the distance to the housing 7 can be secured.

However, if the connector 6 is disposed on the same side as the heat generating members 4 with respect to the lens barrel 1, the thick connector 6 can be an obstacle to hinder the air flow when the air flow caused by the heat generation in the heat generating members 4 flows along the inner face 71*fi*. As a result, a part of the heated air diffuses in the left-right direction, which may lead the air to flow into the arrangement region of the lens barrel 1 which is easily affected by heat.

In contrast, since the connector 6 is disposed on the side opposite to the heat generating members 4 in the left-right direction with respect to the lens barrel 1 as described in the in-vehicle camera 10 of the present application, the heated air can be discharged to the outside without disturbing the air flow by the connector 6 and without making the air approach the lens barrel 1.

Further, in the in-vehicle camera 10, it is necessary to supply a plurality of types of power supply voltages to a plurality of circuit components such as the imaging element 21, the image processing circuit 41, and the memory 42.

Therefore, for example, a plurality of types of power supply circuits for voltages such as 1.0 V, 1.1 V, 1.2 V, 1.8 V, 3.3 V and 5.0 V need to be mounted on the circuit board 5. Since the plurality of types of power supply circuits are formed in the vicinity of the connector 6 with respect to the mounting position of the camera module 3 as a base position, a wide power supply circuit area is required on the side where the connector 6 is disposed.

Therefore, with the lens barrel 1 as a border, a larger mounting area is required on the side where the connector 6 is disposed in the left-right direction than on the side where the heat generating members 4 are disposed, which is seemingly considered to be disadvantageous from the viewpoint of the heat dissipation. However, as described above, most of the generated heat is directly transferred from the heat generating members 4 on the side of the lower mounting face 5*fb* to the lower housing 72 to spread over the entire lower housing 72 and can be dissipated to the outside air.

Therefore, as for the heat transferred on the side of the upper face 5*ft*, it is important to concentrate on controlling the effect on other components and to shorten the residence time of the heated air in the housing 7. From the above point of view, as in the present application, the space on the side where the heat source (heat generating members 4) is located is formed to be narrow, so that the concentration of the upward air movement generated by the heated air causes an increase in the flow speed to quickly discharge the heated air to the outside of the housing 7.

By controlling the air flow as described above, the influence of the heat on the lens barrel 1 can be suppressed, and the influence of the heat on the imaging element 21 which is disposed side by side with the lens barrel 1 in the front-rear direction as the camera module 3.

Meanwhile, an angle of view a in the horizontal direction of the in-vehicle camera for the purpose of forward monitoring has conventionally been about 50 degrees. However, the angle of view a required for in-vehicle cameras in ADAS has been increasing year by year, and a wide angle of view a of 100 degrees or more has also been required. Accordingly, it is preferable that a wide-angle lens necessary for implementing the angle of view a of 100 degrees or more and an imaging element having a higher resolution should be applied, and at the same time, as for the external shape of the in-vehicle camera itself, the dimension of the housing in the left-right direction (x-direction) should be expanded.

In contrast, in the structure in which the image processing circuit 41 is shifted in the left-right direction with respect to the lens barrel 1 as in the present application, it is possible to easily implement the housing 7 having a structure with dimensions that are enlarged in the left-right direction and shortened in the front-rear direction, which is to be required for widening the angle of view. As a result, it is possible to secure a wide driver's field of view by installing the in-vehicle camera at the upper end of the vehicle windshield (front windshield 901).

Variation

Figure 5A:
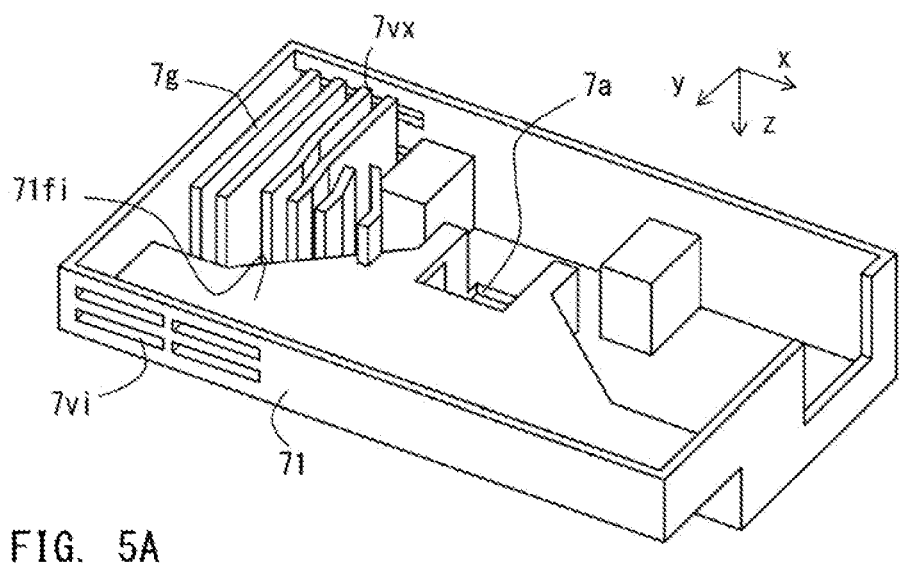
FIG. 5A and FIG. 5B are a perspective view of an upper housing constituting an in-vehicle camera according to a variation of Embodiment 1 as viewed from the bottom side and a partially cutout perspective view in which main components are incorporated inside the upper housing as viewed from the top side, respectively.
Figure 5B:
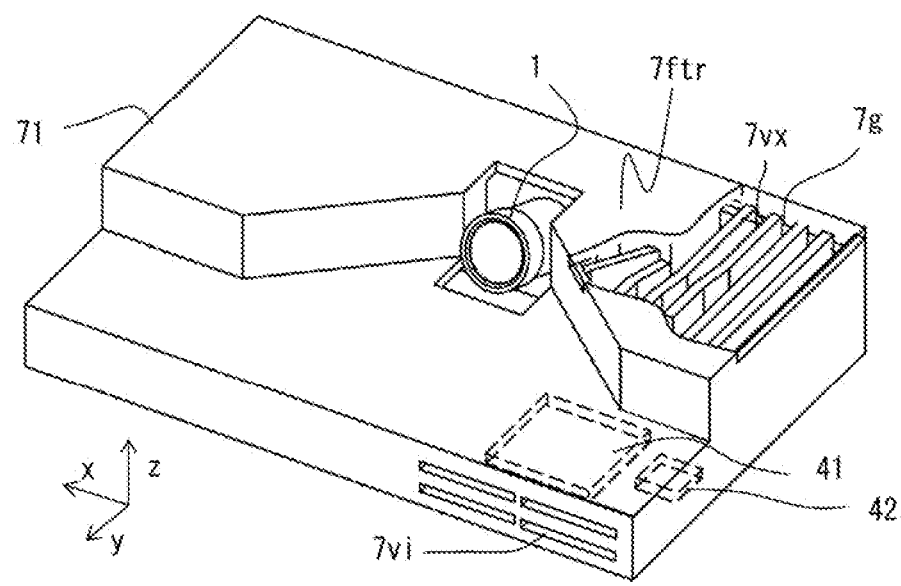
Figure 6A:
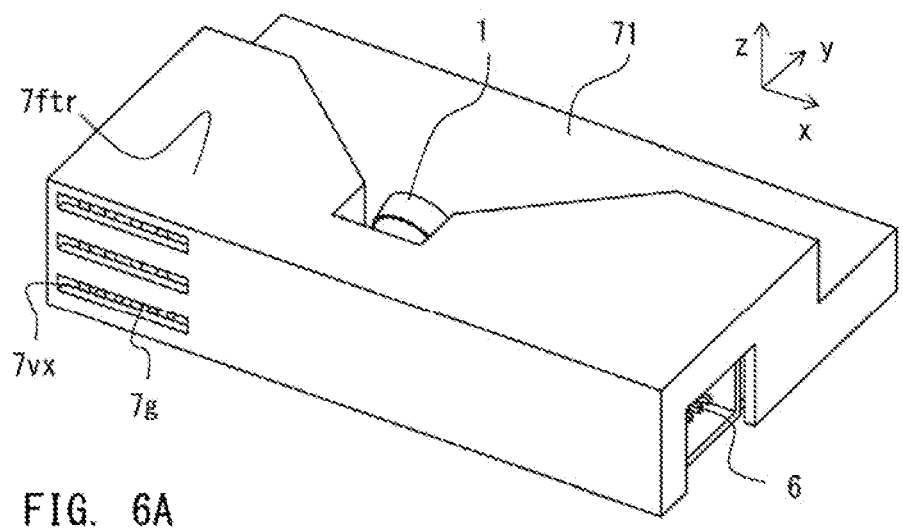
FIG. 6A and FIG. 6B are a perspective view of an upper housing constituting an in-vehicle camera according to a variation of Embodiment 1 as viewed from the rear side in a state in which main components are incorporated, and a partially cutout perspective view as viewed from the bottom side, respectively.
Figure 6B:
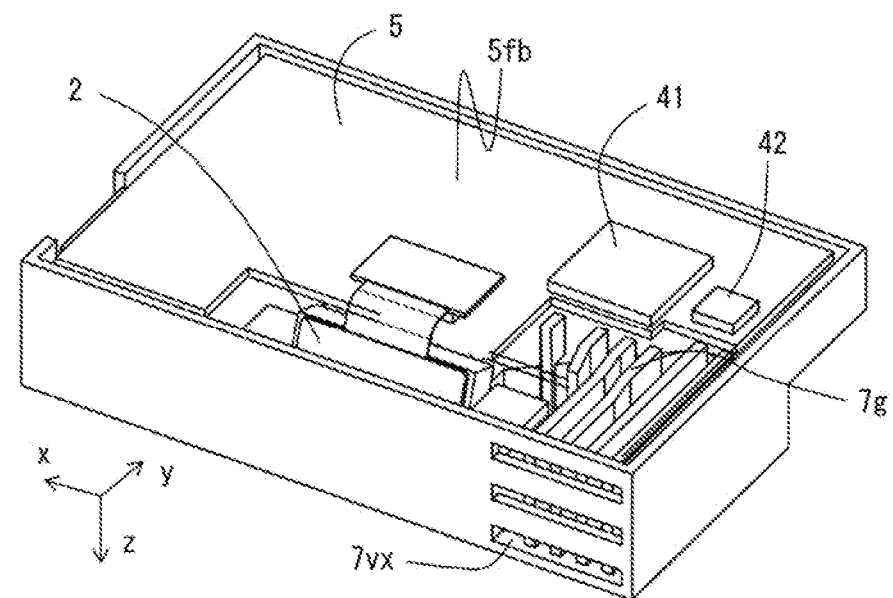

In Embodiment 1 described above, the structure of the ventilation guide for isolating the hot air generated in the arrangement region of the heat generating members from the lens barrel has been exemplified. In the present variation, an example in which the ventilation guide functions as a heat absorbing fin will be described. FIG. 5A, FIG. 5B and FIG. 6A, FIG. 6B are diagrams for describing an in-vehicle camera according to a variation of Embodiment 1, and FIG. 5A is a perspective view of an inner face side corresponding to FIG. 4A as viewed from the bottom side of the upper housing and FIG. 5B is a partially cutout perspective view visualizing an internal structure corresponding to FIG. 4B, which shows a state where the circuit board is incorporated in the upper housing. FIG. 6A is a perspective view of the circuit board incorporated in the upper housing as viewed from the rear side and FIG. 6B is a partially cutout perspective view of an internal structure as viewed from the bottom side.

As shown in FIG. 5A, FIG. 5B and FIG. 6A, FIG. 6B, the in-vehicle camera 10 according to the present variation is provided with three or more ventilation guides 7*g* with their intervals narrowed. Thus, the heated air generated in a region corresponding to each of the plurality of heat generating members 4 can be individually guided toward the exhaust vent 7*vx*. Then, the ventilation guides 7*g* are formed integrally with the upper housing 71 so as to extend from the rear-side inner face 71*fir* of the inner face 71*fi* right below the rear-side top face 7*ftr* that is not exposed to sunlight. Therefore, the surface area of the inner face of the upper housing 71 is enlarged, the heat absorbing effect is enhanced, and the cooling of the heated air caused by the heat generating members 4 can be promoted by the heat sink effect of the upper housing 71 itself. At this time, the heat due to sunlight is not transferred through the ventilation guides 7*g* and does not cause a temperature rise.

Embodiment 2

Figure 7A:
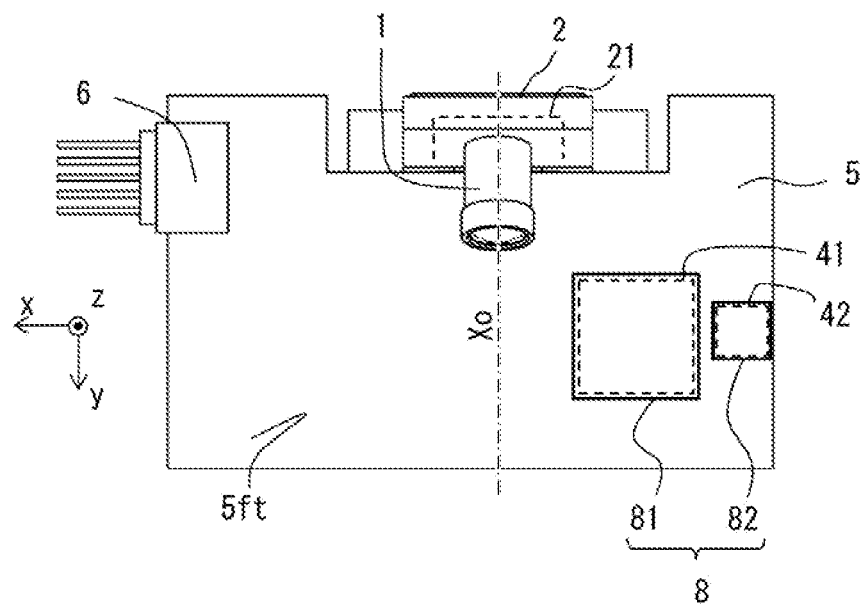
FIG. 7A and FIG. 7B are a plan view showing an arrangement of components on a circuit board constituting an in-vehicle camera according to Embodiment 2 and a partially cutout perspective view in which main components are incorporated inside an upper housing as viewed from the bottom side, respectively.
Figure 7B:
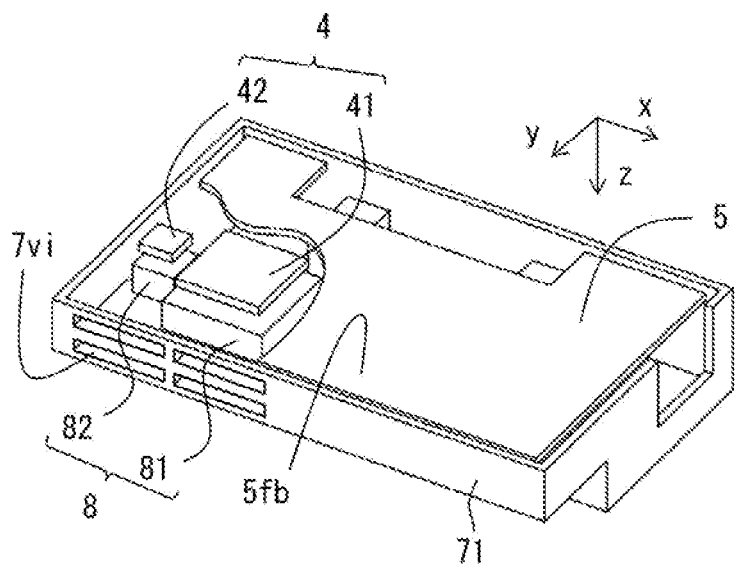

In Embodiment 1, description related to the face of the circuit board opposite to the mounting face of the heat generating members has not been particularly made. In Embodiment 2, an example in which a thermal mass is provided in a region corresponding to the arrangement region of the heat generating members on the face opposite to the mounting face of the heat generating members will be described. FIG. 7A and FIG. 7B includes diagrams for describing an in-vehicle camera according to Embodiment 2, and shows a plan view (FIG. 7A) corresponding to FIG. 1A of Embodiment 1, which shows an arrangement of components on the circuit board and a partially cutout perspective view (FIG. 7B) visualizing an internal structure when the circuit board incorporated in the upper housing is viewed from the bottom side. Note that, in FIG. 7B, a part of drawing in the ventilation guide, the exhaust vent, and the like is omitted for simplification, but the configuration other than the thermal mass is the same as that described in Embodiment 1.

As shown in FIG. 7A and FIG. 7B, in the in-vehicle camera 10 according to Embodiment 2, the thermal mass 8 is provided in a region of the upper face 5 *ft* of the circuit board 5, which corresponds to the arrangement region of the heat generating members 4 in the mounting face 5*fb*. The thermal mass 8 includes a thermal mass 81 in a position corresponding to the arrangement position of the image processing circuit 41 and a thermal mass 82 in a position corresponding to the arrangement position of the memory 42, and they are disposed so as to cover the respective arrangement regions of the image processing circuit 41 and the memory 42.

In Embodiment 1, in order to prevent the heat transmitted from the heat generating members 4 to the upper face 5*ft* from affecting the components such as the lens barrel 1, which is easily affected by heat, the ventilation path is formed to be separated from the lens barrel 1. In Embodiment 2, the surface area of the heat generating portion at the upper face 5*ft* is increased so that the heat dissipation to the flowing air is given priority over the heat transfer within the circuit board 5. Thus, the heat generating region on the upper face 5ft caused by the heat generating members 4 is restricted, and further, the heat dissipation to the air is promoted, so that the reaching temperature is lowered and the influence on the lens barrel 1 is reduced.

Note that, typically, the thermal mass 8 which has an area larger than the arrangement region is used so as to cover the heat generating members 4 as exemplified. However, considering that the heat is mainly dissipated from the side of the lower housing 72, for example, the thermal mass 81 and the thermal mass 82 may be smaller than the arrangement regions of the image processing circuit 41 and the memory 42, respectively, and may be formed in their inner regions.

When the heat is transferred from the heat generating members 4 to the side of the upper face 5ft, the heat generating region spreads larger than the arrangement region, but by providing the thermal mass 8 smaller than the arrangement region, the heat is intensively transferred to the thermal mass 8 and the heat generating region can be made smaller than the arrangement region. This further reduces the influence of the heat generated by the heat generating members 4 on the lens barrel 1. Although the thermal mass 8 is drawn in an angular shape in the figures, the thermal mass 8 may be formed smoothly in shape so as not to obstruct the air flow, and may be formed in a fin shape such as the ventilation guide 7g.

Note that, although various exemplary embodiments and examples are described in the present application, various features, aspects, and functions described in one or more embodiments are not inherent in a particular embodiment and can be applicable alone or in their various combinations to each embodiment. Accordingly, countless variations that are not illustrated are envisaged within the scope of the art disclosed herein. For example, the case where at least one component is modified, added or omitted, and the case where at least one component is extracted and combined with a component in another embodiment are included.

For example, the heat generating members 4 may also include other components than the image processing circuit 41 and the memory 42. Further, although the intake vent 7vi and the exhaust vent 7vx are provided on the front side and the rear side, respectively, they are not limited to these and may be provided on the top face 7ft or sides on the left and right side, for example, as long as the relationship of the bottom side and the top side can be formed in the mounted state.

As described above, the in-vehicle camera 10 according to each embodiment comprises the lens barrel 1 to form an image of light from a subject on a sensor surface of the imaging element 21; the circuit board 5 on which the image processing circuit 41 is mounted, the image processing circuit being wire-connected to the imaging element 21 and performing image processing to recognize the subject from a video signal output from the imaging element 21; and the housing 7 including the installation face (top face 7ft) to be attached to the inner face (901fi) of a front window (front windshield 901) or a rear window of a vehicle that slopes in the front-rear direction (inclined with respect to the vertical line), a vent hole (intake vent 7vi, exhaust vent 7vx) formed at each of the ends located on the lower side and the upper side when the installation face (top face 7ft) is attached along the inner face (901fi), and a holding mechanism (reference sign is not shown) to hold the lens barrel 1 (at an angle with respect to the installation face) with a portion thereof exposed from the installation face (top face 7ft) such that the optical axis Xo extends toward the outside of a vehicle, the housing 7 accommodating the circuit board 5 while separating the image processing circuit 41 (and the heat generating members 4 including the memory 42 and the like) and the lens barrel 1 from each other in the direction that is parallel to the installation face (top face 7ft) and is perpendicular to the optical axis Xo (left-right direction: x-direction). Therefore, when the in-vehicle camera is configured such that a ventilation passage connecting the vent hole (intake vent 7vi) on the lower side and the vent hole (exhaust vent 7vx) on the upper side is formed between the inner face 71fi on the side of the installation face (top face 7ft) of the housing 7 and the circuit board 5 in a path that is away from the lens barrel 1 and passes through a region in which the image processing circuit 41 (the same as above) is disposed, a highly reliable in-vehicle camera that can efficiently dissipate the heat can be obtained because the air (hot air) heated by the heat generating members 4 is discharged outside the housing 7 so as to avoid the lens barrel 1.

In the direction that is parallel to the installation face (top face 7ft) and is perpendicular to the optical axis Xo (left-right direction: x-direction), an opening region of the vent hole on the lower side (intake vent 7vi) includes a range in which the image processing circuit 41 (and the heat generating members 4 including the memory 42 and the like) is disposed. And an opening region of the vent hole on the upper side (exhaust vent 7vx) is narrower than the opening region of the vent hole on the lower side (intake vent 7vi), and an end thereof closer to the lens barrel 1 is located inside the range in which the image processing circuit 41 (the same as above) is disposed. Therefore, the air outside the housing 7 flowing in from the intake vent 7vi takes away the heat in the arrangement region of the heat generating members 4, and when the air heated thereby flows toward the exhaust vent 7vx, the air is guided away from the lens barrel 1, and thus the influence of the hot air on the lens barrel 1 can be further reduced.

If the inner face 71fi is formed with the ventilation guide 7g that protrudes toward the circuit board 5 and extends from the lower side toward the upper side (in the y-direction), the path of the ventilation passage can be securely controlled. In particular, if the ventilation guide 7g is formed on the rear-side inner face 71fir, the ventilation guide 7g functions as the heat absorbing fin without being affected by sunlight, and the heat can be taken away from the hot air and dissipated through the housing 7.

If the housing 7 is formed of a conductive material such as an aluminum die-cast, and the dimension of the continuous opening in the vent hole (intake vent 7vi, exhaust vent 7vx) is equal to or less than 18 mm, penetration or leakage of the electromagnetic noise up to 4 GHz is prevented, and operational reliability is further improved.

If the connector 6 for making an electrical connection with another device provided in a vehicle is disposed on the opposite side of the image processing circuit 41 (and the heat generating members 4 including the memory 42 and the like) with respect to the plane that includes the optical axis Xo and is perpendicular to the installation face (top face 7ft), the hot air can be smoothly discharged because there is no obstacle in the ventilation passage. Further, the heat generating members 4 can be gathered in a narrow region in the left-right direction, and the upward air flow in the ventilation passage can be efficiently generated.

Further, if the circuit board 5 is accommodated in the housing 7 with a mounting face 5fb of the image processing circuit 41 (and the heat generating members 4 including the memory 42 and the like) facing the side opposite to the installation face (top face 7ft) side and a heat transfer path is (directly or indirectly) formed between the image processing circuit 41 (the same as above) and the face (inner face 72*fi*) that faces the mounting face 5*fb* in the inner face of the housing 7, most of the heat generated by the heat generating members 4 can be dissipated through the housing 7 (mainly the lower housing 72) without being affected by sunlight.

In addition, if the thermal mass 81 (thermal mass 8 also including thermal mass 82) is disposed in the arrangement region of the image processing circuit 41 (and the heat generating members 4 including the memory 42 and the like) on the face (upper face 5*ft*) of the circuit board 5 opposite to the mounting face 5*fb*, the heat transferred on the side of the upper face 5 *ft* is efficiently dissipated into the air flowing through the ventilation passage, and the influence of the heat on the lens barrel 1 can be suppressed.

Note that, if the cutout portion 5*n* is provided in the portion (the side on the rear side) located on the upper side in the circuit board 5 and the board (camera board 2) on which the imaging element 21 is mounted is fitted into the cutout portion 5*n*, the dimension in the front-rear direction can be shortened to take advantage of the wide angle, and it is possible to make the in-vehicle camera compact, so that the view of the driver is not obstructed.

DESCRIPTION OF REFERENCE NUMERALS AND SIGNS

1 lens barrel, 10 in-vehicle camera, 2 camera board, 21 imaging element, 3 camera module, 4 heat generating member, 41 image processing circuit, 42 memory, 5 circuit board, 6 connector, 7 housing, 71 upper housing, 71*fi* inner face, 72 lower housing, 72*fi* inner face, 75 bracket, 7 *ft* top face (installation face), 7*g* ventilation guide, 7*vi* intake vent (vent hole on the lower side), 7*vx* exhaust vent (vent hole on the upper side), 8 thermal mass, 81 thermal mass, 82 thermal mass, 901 front windshield (glass), 901*fi* inner face, G1 interval (to lens barrel), G21 interval (to imaging element), Xo optical axis, a angle of view (in the horizontal direction), B angle of view (in the vertical direction)

The invention claimed is:

1. An in-vehicle camera comprising:
a lens barrel to form an image of light from a subject on a sensor surface of an imaging element;
a circuit board on which an image processing circuit is mounted, the image processing circuit being wire-connected to the imaging element and performing image processing to recognize the subject from a video signal output from the imaging element; and
a housing including an installation face to be attached to a vehicle inner face of a front windshield or a rear windshield of a vehicle that slopes in a front-rear direction, a vent hole formed at each of ends located on a lower side and an upper side when the installation face is attached along the vehicle inner face, and a holder to hold the lens barrel with a portion thereof exposed from the installation face such that an optical axis extends toward an outside of the vehicle, the housing accommodating the circuit board while separating the image processing circuit and the lens barrel from each other in a direction that is parallel to the installation face and is perpendicular to the optical axis, wherein
a ventilation passage connecting the vent hole on the lower side and the vent hole on the upper side is formed between an inner face of the housing on a side of the installation face and the circuit board in a path that is away from the lens barrel and passes through a region in which the image processing circuit is disposed,
wherein, in the direction that is parallel to the installation face and is perpendicular to the optical axis, an opening region of the vent hole on the lower side includes a range in which the image processing circuit is disposed, and
wherein an opening region of the vent hole on the upper side is narrower than the opening region of the vent hole on the lower side, and an end thereof closer to the lens barrel is located inside the range in which the image processing circuit is disposed.

2. The in-vehicle camera according to claim 1, wherein the inner face of the housing is formed with a ventilation guide that protrudes toward the circuit board and extends from the lower side toward the upper side.

3. The in-vehicle camera according to claim 2, wherein the circuit board is accommodated in the housing with a mounting face of the image processing circuit facing a side opposite to the installation face side; and
a heat transfer path is formed between the image processing circuit and a face that faces the mounting face in the inner face of the housing.

4. The in-vehicle camera according to claim 2, wherein a cutout portion is provided in a portion located on the upper side in the circuit board; and
a board on which the imaging element is mounted is fitted into the cutout portion.

5. The in-vehicle camera according to claim 1, wherein the housing is formed of a conductive material, and a dimension of a continuous opening in the vent hole is equal to or less than 18 mm.

6. The in-vehicle camera according to claim 5, wherein the circuit board is accommodated in the housing with a mounting face of the image processing circuit facing a side opposite to the installation face side; and
a heat transfer path is formed between the image processing circuit and a face that faces the mounting face in the inner face of the housing.

7. The in-vehicle camera according to claim 1, wherein a connector for making an electrical connection with another device provided in the vehicle is disposed on an opposite side of the image processing circuit with respect to a plane that includes the optical axis and is perpendicular to the installation face.

8. The in-vehicle camera according to claim 7, wherein the circuit board is accommodated in the housing with a mounting face of the image processing circuit facing a side opposite to the installation face side; and
a heat transfer path is formed between the image processing circuit and a face that faces the mounting face in the inner face of the housing.

9. The in-vehicle camera according to claim 7, wherein a cutout portion is provided in a portion located on the upper side in the circuit board; and
a board on which the imaging element is mounted is fitted into the cutout portion.

10. The in-vehicle camera according to claim 1, wherein the circuit board is accommodated in the housing with a mounting face of the image processing circuit facing a side opposite to the installation face side; and
a heat transfer path is formed between the image processing circuit and a face that faces the mounting face in the inner face of the housing.

11. The in-vehicle camera according to claim 10, wherein a thermal mass is disposed in an arrangement region of the image processing circuit on a face of the circuit board opposite to the mounting face.

12. The in-vehicle camera according to claim 10, wherein
a cutout portion is provided in a portion located on the upper side in the circuit board; and
a board on which the imaging element is mounted is fitted into the cutout portion.

13. The in-vehicle camera according to claim 1, wherein
a cutout portion is provided in a portion located on the upper side in the circuit board; and
a board on which the imaging element is mounted is fitted into the cutout portion.

14. An in-vehicle camera comprising:
a lens barrel to form an image of light from a subject on a sensor surface of an imaging element;
a circuit board on which an image processing circuit is mounted, the image processing circuit being wire-connected to the imaging element and performing image processing to recognize the subject from a video signal output from the imaging element; and
a housing including an installation face to be attached to a vehicle inner face of a front windshield or a rear windshield of a vehicle that slopes in a front-rear direction, a vent hole formed at each of ends located on a lower side and an upper side when the installation face is attached along the vehicle inner face, and a holder to hold the lens barrel with a portion thereof exposed from the installation face such that an optical axis extends toward an outside of the vehicle, the housing accommodating the circuit board while separating the image processing circuit and the lens barrel from each other in a direction that is parallel to the installation face and is perpendicular to the optical axis, wherein
a ventilation passage connecting the vent hole on the lower side and the vent hole on the upper side is formed between an inner face of the housing on a side of the installation face and the circuit board in a path that is away from the lens barrel and passes through a region in which the image processing circuit is disposed, and
wherein a connector for making an electrical connection with another device provided in the vehicle is disposed on an opposite side of the image processing circuit with respect to a plane that includes the optical axis and is perpendicular to the installation face.

* * * * *